US006726557B2

(12) United States Patent
Dreyer et al.

(10) Patent No.: US 6,726,557 B2
(45) Date of Patent: Apr. 27, 2004

(54) VEHICLE HAVING A SOUND-RADIATING ELEMENT

(75) Inventors: Jürgen Dreyer, Schafheim (DE); Rolf Janke, Kiel (DE); Heiko Schnieders, Schafheim (DE); Michael Hein, Revensdorf (DE); Winfried Möll, Laubach (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/235,764

(22) Filed: Sep. 4, 2002

(65) Prior Publication Data

US 2003/0108211 A1 Jun. 12, 2003

(30) Foreign Application Priority Data

Sep. 11, 2001 (DE) ........................................ 101 44 787

(51) Int. Cl.[7] ................................................ B60H 1/34

(52) U.S. Cl. ....................................... 454/152; 181/211

(58) Field of Search ................................ 454/143, 152; 181/211, 206

(56) References Cited

U.S. PATENT DOCUMENTS

| | | | | | |
|---|---|---|---|---|---|
| 5,709,601 | A | * | 1/1998 | Heck | 454/121 |
| 5,828,759 | A | * | 10/1998 | Everingham | 381/71.5 |
| 5,938,266 | A | | 8/1999 | Dauvergne et al. | |
| 5,967,585 | A | * | 10/1999 | Sprague | 296/39.1 |

FOREIGN PATENT DOCUMENTS

| | | |
|---|---|---|
| DE | 19654416 | 5/1998 |
| FR | 2780010 | 12/1999 |
| JP | 05016733 | 1/1993 |

* cited by examiner

*Primary Examiner*—Gregory A. Wilson
(74) *Attorney, Agent, or Firm*—Martin A. Farber

(57) ABSTRACT

A vehicle (1) having a sound-radiating element (10) for emitting sound waves into a passenger compartment (2) and having an air duct (6) for the air conditioning of the passenger compartment (2), the air duct (6) having an air duct inner wall (7) facing the passenger compartment (2). To reduce the installation space for the sound-radiating element and to simplify the assembly, the sound-radiating element (10) has the air duct inner wall (7) and an oscillation exciter (9) arranged on the air duct inner wall (7), for exciting oscillation of the air duct inner wall (7).

10 Claims, 3 Drawing Sheets

VEHICLE HAVING A SOUND-RADIATING ELEMENT

The invention relates to a vehicle having a sound-radiating element for emitting sound waves into a passenger compartment and having an air duct for the air conditioning of the passenger compartment, the air duct having an air duct inner wall facing the passenger compartment.

FIELD AND BACKGROUND OF THE INVENTION

Vehicles of this type are known, for example, as watercraft or aircraft, but in particular as motor vehicles. A sound-radiating element which is constructed as a loudspeaker and serves as part of an audio system for the acoustic irradiation of the passenger compartment is provided. The passenger compartment may be either essentially closed or open to the outside—such as, for example, in the case of a convertible. Furthermore, it is customary in such vehicles to provide air ducts for air conditioning, i.e. for ventilating and/or for heating and/or cooling the passenger compartment. Particularly in the cockpit region of the vehicle, the air ducts are constructed in such a manner that they have, at least in part, an inner wall facing the passenger compartment.

A disadvantage of the known vehicles is that the installation space for loudspeakers is very limited. In the cockpit region, in particular, only a very small amount of installation space is available for the loudspeakers owing to a multiplicity of devices to be arranged, such as display instruments, climate control devices, storage compartments, air ducts and air outlet openings. Therefore, if any loudspeakers at all are installed in the cockpit, they are only small with weak sound, and, if appropriate, loudspeakers are arranged in the vehicle doors where somewhat more installation space is available. However, the installation of loudspeakers in doors involves further disadvantages, such as sound problems and a necessity of a special seal against moisture.

It is known from DE 196 54 416 C1 to provide a cover for the interior of a vehicle having a grid-like surface which is provided with passages in at least one subregion, it being possible to insert the cover into an interior paneling or into an instrument panel, and the subregion having passages covering an opening of an air line running in or behind the interior paneling or the instrument panel. This cover is formed in such a manner that at least one further subregion of the grid-like surface with passages is provided, which subregion covers a loudspeaker arranged in a recess of the interior paneling or of the instrument panel. Although different devices can therefore be combined in a space-saving manner, this cover disadvantageously does not enlarge the installation space available for the loudspeaker either.

SUMMARY OF THE INVENTION

The invention is therefore based on the object of providing a vehicle of the type mentioned at the beginning which has a sound-radiating element of high sound quality with only little installation space additionally required.

This object is achieved according to the invention by the fact that the sound-radiating element has the air duct inner wall and an oscillation exciter arranged on the air duct inner wall, for exciting oscillation of the air duct inner wall.

Owing to such a construction, it is not required to install into the vehicle completely pre-assembled loudspeakers having a diaphragm and exciter. A loudspeaker diaphragm can be omitted, since it is replaced by the air duct inner wall, which therefore fulfills a dual function. Excitation of oscillations for the issuing of sound waves by the air duct inner wall takes place by means of the oscillation exciter. Thus, not only is the installation space reduced, but, because of the reduction in the number of components, there is also a reduction in the assembly and logistical costs. In addition, there is a reduction in weight of the vehicle, and the installation of additional covering grids, as are required in front of loudspeakers in order to protect them from mechanical damage, can be omitted.

It is conceivable to arrange the oscillation exciter, for example for simple assembly, on the outside of the air duct inner wall, that is to say directly in the passenger compartment. In contrast, according to an advantageous development of the invention, the oscillation exciter is arranged within the air duct, as a result of which—by using an existing area of space—firstly, the installation space is further reduced and, secondly, by means of the concealed fitting of the oscillation exciter damage to it by external influences is virtually eliminated.

A further simplification of the assembly advantageously results if the oscillation exciter is bonded to the air duct inner wall.

In principle, the electromechanical construction of the oscillation exciter is free; however, recourse can be made in a simple manner to cost-effective mass-produced components if, according to another advantageous development of the invention, the oscillation exciter has an oscillation coil.

The acoustic quality of the sound-radiating element is directly influenced by the oscillation behavior of the air duct inner wall. It is advantageous, particularly in the case of freely shaped air ducts, if, for the acoustic tuning of the sound-radiating element, a weight element is arranged on the air duct inner wall. This weight element, which is preferably bonded onto the air duct inner wall, can be placed in such a manner that—depending on the respective type of vehicle and/or on a special design of the air duct—an optimization of sound is achieved. It is favorable to use a component of high density for the weight element. For example, a metal is appropriate for this.

In principle, the air duct can be arranged at any point in the passenger compartment of the vehicle. However, according to an advantageous development of the invention, the air duct is arranged with the oscillation exciter in a cockpit element, as a result of which particularly large areas of the air duct inner wall are available for producing sound. The cockpit element may, for example, be an instrument panel, in particular an instrument panel covering.

The vehicle assembly is further simplified if the air duct is connected to the cockpit element preferably forming a single component, as a result of which a particularly low number of components arises.

A very effective acoustic irradiation of the passenger compartment is achieved with another advantageous development of the invention, in which the air duct inner wall with the oscillation exciter is arranged approximately horizontally in the region of a windshield. As a result, the sound waves emitted by the sound-radiating element can be deflected at the windshield into the entire passenger compartment. A configuration of this type is particularly appropriate if the air duct is arranged in the instrument panel.

A large sound volume and, in particular, also an acoustic stereo effect can advantageously be achieved in a simple manner if the air duct extends approximately over the entire width of the passenger compartment and a respective oscillation exciter is arranged in a region of the air duct on the right in the direction of travel and in a region on the left in the direction of travel.

The production of the air duct and therefore also of the vehicle is particularly cost-effective and simple if the air duct is a blown plastic component. An integration of the air duct in other installation parts of the passenger compartment, for example in the cockpit element, can therefore be achieved in a particularly simple manner.

BRIEF DESCRIPTION OF THE DRAWINGS

The invention will be explained in greater detail below with reference to exemplary embodiments illustrated in the attached drawing, in which.

Corresponding elements are in each case provided with the same reference numbers in the figures.

DETAILED DESCRIPTION OF THE PREFERRED EMBODIMENT

Figure 1:
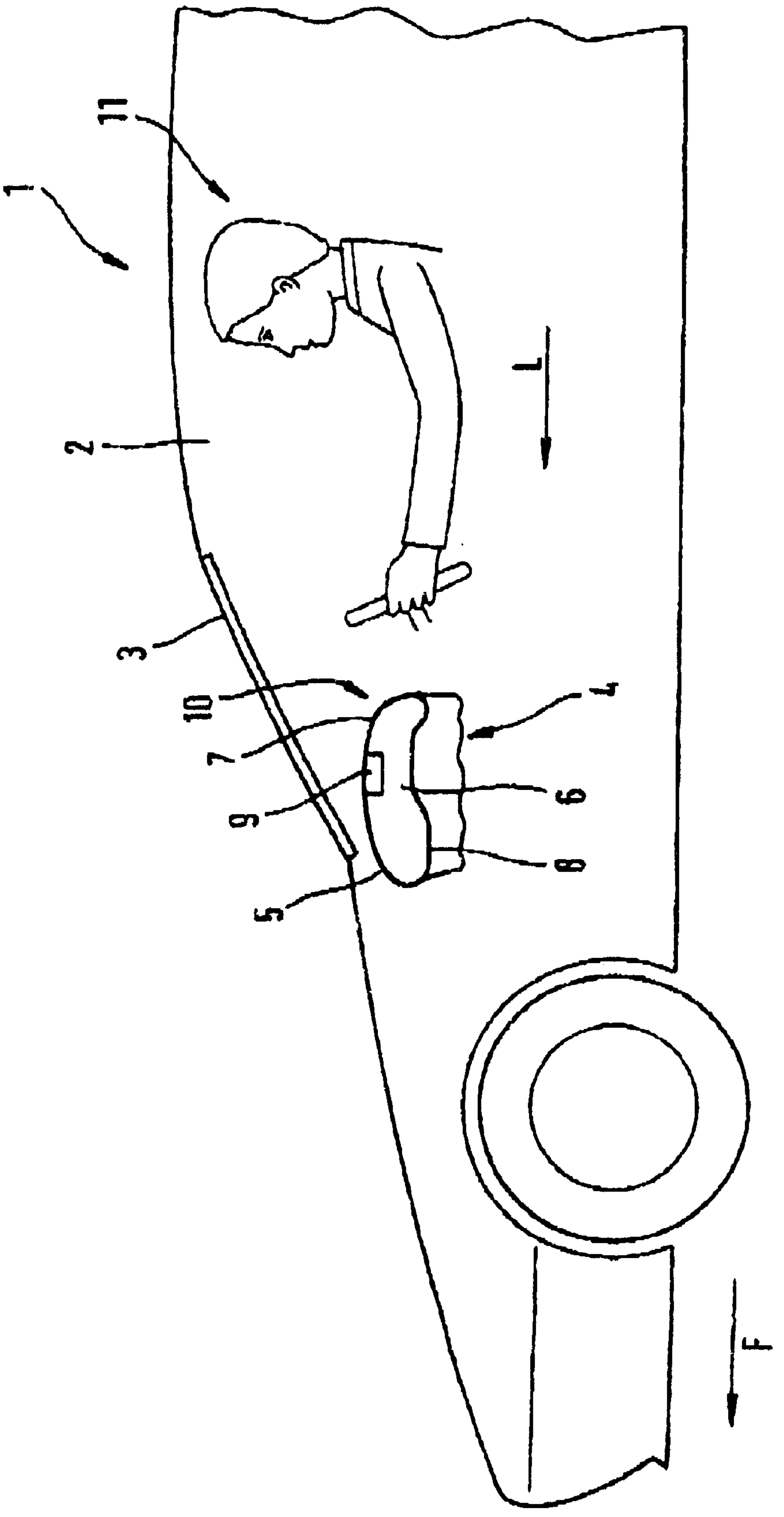
FIG. 1 shows a partial section of a vehicle having a sound-radiating element and an air duct.

In FIG. 1, in a stylized partial section, a motor vehicle 1 having a passenger compartment 2 and a windshield 3 is illustrated. Among other things, a cockpit element, which is formed by an instrument panel 4, only part of which is shown here, is arranged in the passenger compartment 2. The instrument panel 4 has an instrument panel covering 5.

The instrument panel covering 5, which is an elongate component and extends approximately in the transverse direction of the motor vehicle 1, covers an air duct 6, which forms a single component with it and the instrument panel 4, with an air duct inner wall 7, which faces the passenger compartment 2 and adjoins the latter, and an air duct outer wall 8, which faces away from the passenger compartment 2. An oscillation exciter 9 is arranged on the air duct inner wall 7 of the air duct 6, which is constructed as a blown plastic component. The oscillation exciter 9 is bonded onto the air duct inner wall 7 within the air duct 6.

The air duct inner wall 7 and the oscillation exciter 9 belong to a sound-radiating element 10 which is part of an audio system (not illustrated further here) of the motor vehicle 1 and serves for emitting sound waves into the passenger compartment 2, so that a vehicle occupant 11 in the motor vehicle 1 may, for example, listen to the radio. The sound is produced by oscillations of the air duct inner wall 7, which are caused by excitation of the air duct inner wall 7 by means of the oscillation exciter 9.

The air duct 6 may also have openings (not illustrated here) toward the passenger compartment 2, through which air can be fed into the passenger compartment 2 or can be removed from the passenger compartment 2.

Figure 2:
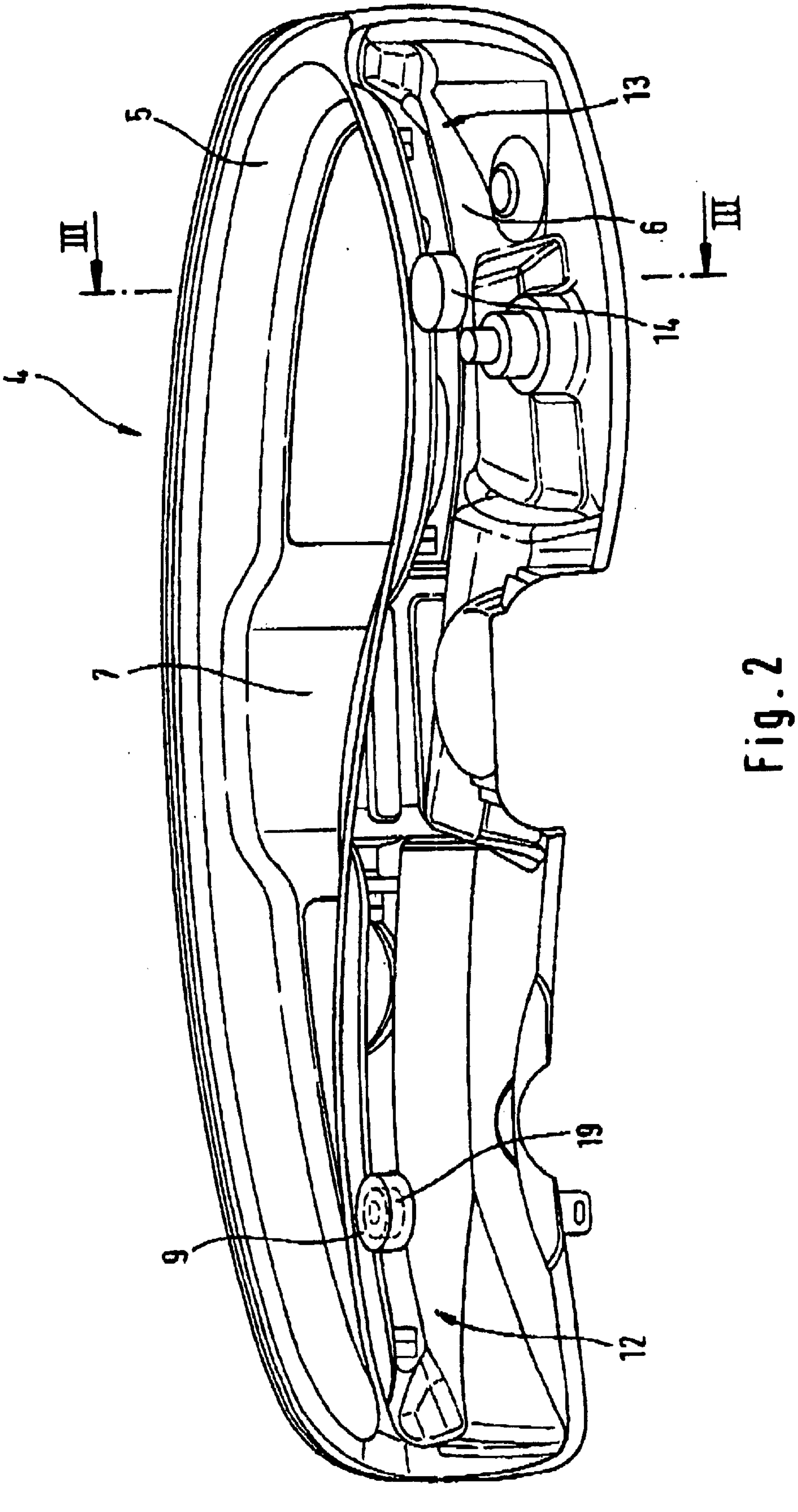
FIG. 2 shows a cockpit element having a sound-radiating element in a perspective view.

In FIG. 2, a cockpit element constructed as an instrument panel 4 and similar to FIG. 1 is illustrated enlarged and in a perspective view approximately in the direction L of the longitudinal axis of the vehicle (cf. FIG. 1). The air duct 6 extends approximately over the entire length of the instrument panel 4 (i.e. approximately over the entire width of the passenger compartment) and is essentially formed by its outer walls, to which the instrument panel covering 5 also belongs. On the air duct inner wall 7, a first oscillation exciter 9, in which an oscillation coil 19 is indicated, is arranged in a region 12 of the air duct 6 which is on the left in the direction of travel F (cf. FIG. 1), and a second oscillation exciter 14 is arranged in a region 13 of the air duct 6 which is on the right in the direction of travel. As a result, a stereo reproduction of sound can take place for the vehicle occupants.

As can also be gathered from FIG. 1, the air duct inner wall 7 is arranged approximately horizontally in the region of the windshield 3, so that the sound waves emitted by the sound-radiating element 10 can be deflected at the windshield 3 and distributed in the entire passenger compartment.

Figure 3:
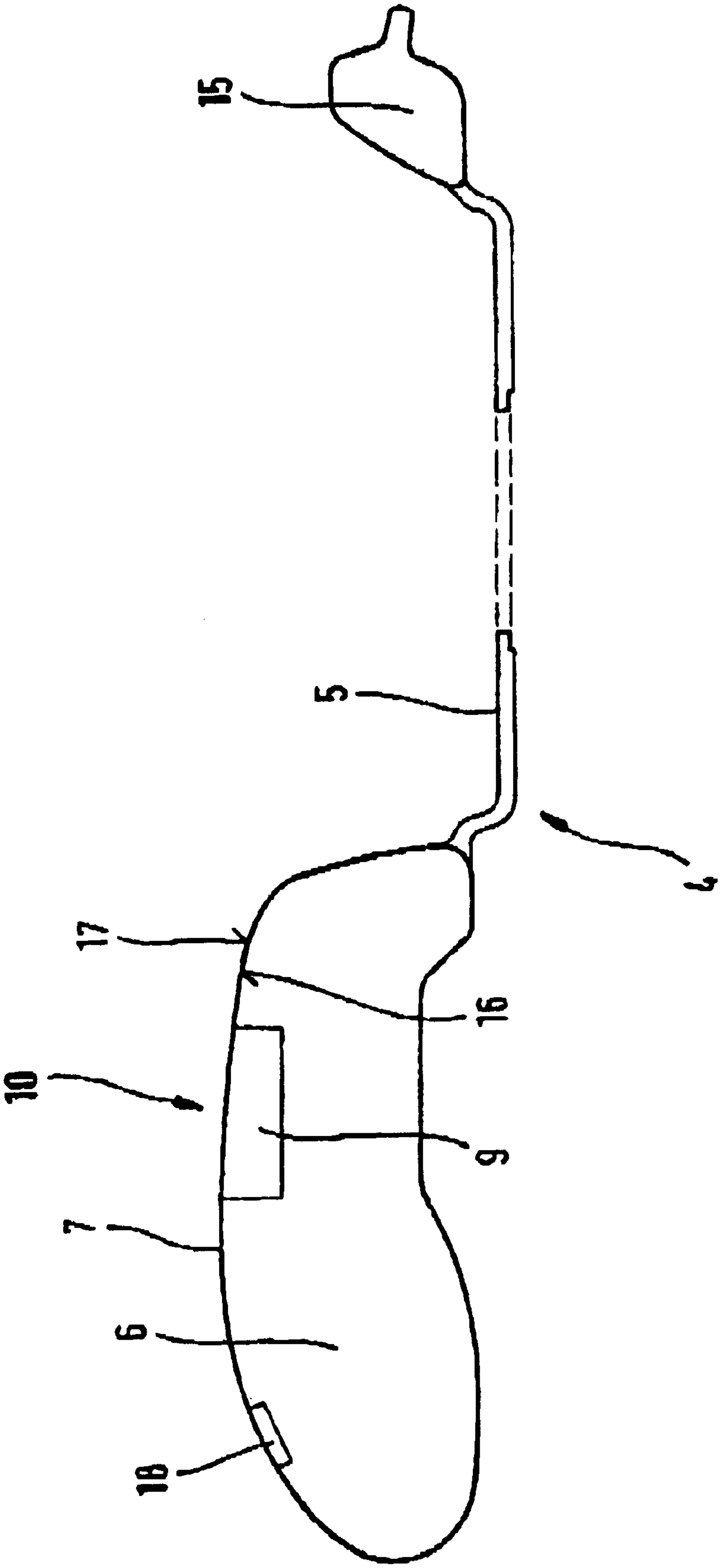
FIG. 3 shows a section along the line III—III through the cockpit element according to FIG. 2.

An enlarged section through the instrument panel 4 along the line III—III from FIG. 2 is reproduced in FIG. 3. It can be seen therein that the instrument panel covering 5 not only closes off a first air duct 6, but also a second air duct 15 from a passenger compartment (not illustrated further here) of a motor vehicle. In the first air duct 6, an oscillation exciter 9 is fitted on an inner side 16 of an air duct inner wall 17. In principle, it would also be conceivable to arrange the oscillation exciter on an outer side 17 of the air duct inner wall 7. A weight element 18, which is constructed as a small metal plate, for the acoustic tuning of the sound-radiating element 10 having the oscillation exciter 9 and the air duct inner wall 7 can furthermore be gathered from FIG. 3. The weight element 18 is bonded in a simple manner onto the inner side 16 of the air duct inner wall 7.

We claim:

1. A vehicle having a sound-radiating element for emitting sound waves into a passenger compartment (2) of the vehicle (1), the vehicle having an air duct (6) for air conditioning of the passenger compartment (2), the air duct (6) having an air duct inner wall (7) facing the passenger compartment (2), and wherein the sound-radiating element (10) comprises the air duct inner wall (7) and an oscillation exciter (9), wherein the oscillation exciter is arranged on the air duct inner wall for exciting oscillation of the air duct inner wall (7), the sound being produced by the oscillation of the air duct inner wall.

2. The vehicle as claimed in claim 1, wherein the oscillation exciter (9) is arranged within the air duct (6).

3. The vehicle as claimed in claim 1, wherein the oscillation exciter (9) is bonded to the air duct inner wall (7).

4. The vehicle as claimed in claim 1, wherein the oscillation exciter (9) has an oscillation coil (19).

5. The vehicle as claimed in claim 1, wherein for acoustic tuning of the sound-radiating element (10) a weight element (18) is arranged on the air duct inner wall (7).

6. The vehicle as claimed in claim 1, wherein the air duct (6) is arranged with the oscillation exciter (9) in a cockpit element (4).

7. The vehicle as claimed in claim 6, wherein the air duct (6) is connected to the cockpit element (4) forming a single component.

8. The vehicle as claimed in claim 1, wherein the air duct inner wall (7) with the oscillation exciter (9) is arranged approximately horizontally in a region of a windshield (3) of the vehicle (1).

9. The vehicle as claimed in claim 1, wherein the air duct (6) extends approximately over the entire width of the passenger compartment (2) and a respective oscillation exciter (9, 14) is arranged in a region (13) of the air duct (6) on right in direction of travel (F) and in a region (12) on left in the direction of travel (F).

10. The vehicle as claimed in claim 1, wherein the air duct (6) is a blown plastic component.

* * * * *